United States Patent [19]

McAllister et al.

[11] Patent Number: 5,680,942

[45] Date of Patent: Oct. 28, 1997

[54] OVERHEAD TRACK HIGH DENSITY STORAGE SYSTEM WITH CENTER AND SIDE GUIDE ROLLERS AND CASTER LOCK ALIGNMENT CLIP

[75] Inventors: Larry N. McAllister, Dover; John D. Poore, Smyrna; William L. Bartz, Jr., Dover, all of Del.

[73] Assignee: Metal Masters Foodservice Equipment Co., Inc., Clayton, Del.

[21] Appl. No.: 443,928

[22] Filed: May 18, 1995

[51] Int. Cl.[6] .................................... A47F 5/00
[52] U.S. Cl. ..................... 211/162; 211/187; 16/35 R
[58] Field of Search ........................... 211/162, 126, 211/10, 151, 41, 187; 312/201, 307, 318, 321, 330.1, 334.4, 349; 104/119, 121; 280/87.051, 47.16, 186; 16/35 R, 35 D

[56] References Cited

U.S. PATENT DOCUMENTS

| 430,098 | 6/1890 | Wheeler | 104/119 |
|---|---|---|---|
| 766,660 | 8/1904 | Bohannan | 211/46 X |
| 1,530,211 | 3/1925 | Siemnash | 287/7.13 |
| 1,807,075 | 5/1931 | Skar et al. | 104/121 |
| 3,070,828 | 1/1963 | Clinton et al. | 16/35 R |
| 3,424,111 | 1/1969 | Maslow | 108/144 |
| 3,570,683 | 3/1971 | Dickgiesser | 211/162 |
| 3,671,062 | 6/1972 | Ashworth | 403/292 |
| 3,757,705 | 9/1973 | Maslow | 108/144 |
| 3,900,108 | 8/1975 | Rottermann et al. | 211/162 X |
| 3,973,504 | 8/1976 | Knudsen | 211/162 X |
| 4,061,379 | 12/1977 | Randall | 312/201 |
| 4,462,500 | 7/1984 | Konstant et al. | 211/162 X |
| 4,615,449 | 10/1986 | Naito et al. | 211/162 |
| 4,678,085 | 7/1987 | Sando | 211/162 X |
| 4,807,765 | 2/1989 | Brown et al. | 211/126 X |
| 4,941,578 | 7/1990 | Devening | 211/162 X |
| 4,991,725 | 2/1991 | Welsch et al. | 211/162 |
| 5,072,838 | 12/1991 | Price, Jr. et al. | 211/162 |
| 5,154,305 | 10/1992 | Whitney | 211/162 |
| 5,341,944 | 8/1994 | Latino | 211/162 |
| 5,390,803 | 2/1995 | McAllister | 211/153 |

FOREIGN PATENT DOCUMENTS

| 1 144 064 | 2/1963 | Germany . |
|---|---|---|
| 2 614 159 | 10/1977 | Germany . |
| 2 085 284 | 4/1982 | United Kingdom . |

*Primary Examiner*—Robert W. Gibson, Jr.

[57] ABSTRACT

An overhead track high density storage system is formed by connecting an overhead track to the top posts of stationary storage units, thereby holding the track above a horizontal support surface, such as the floor. Movable storage units, such as shelves mounted on casters, are positioned between the stationary storage units. Guide roller means attached to the top of the movable storage units are received within the track so that translational movement of the movable storage unit is confined to a path defined by the track. The guide roller means include a center guide roller and at least one side guide roller mounted for rotational movement to a guide roller support channel. Each caster is locked into a directional position to prevent swiveling with a single caster alignment clip, which includes upstanding fingers defining a slot therebetween. The slot of the clip engages a portion of the movable storage unit, such as a support rod in a truss of a wire shelf that forms a part of the movable storage unit.

16 Claims, 3 Drawing Sheets

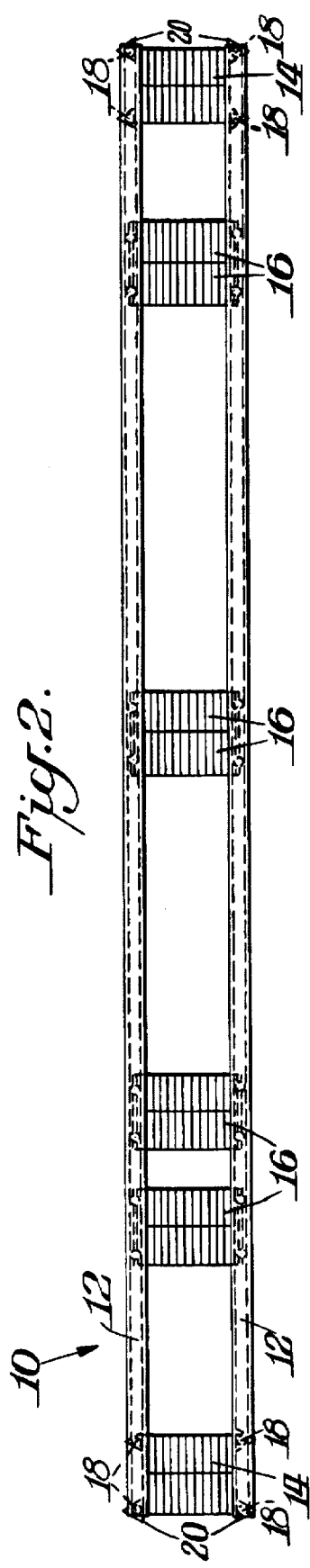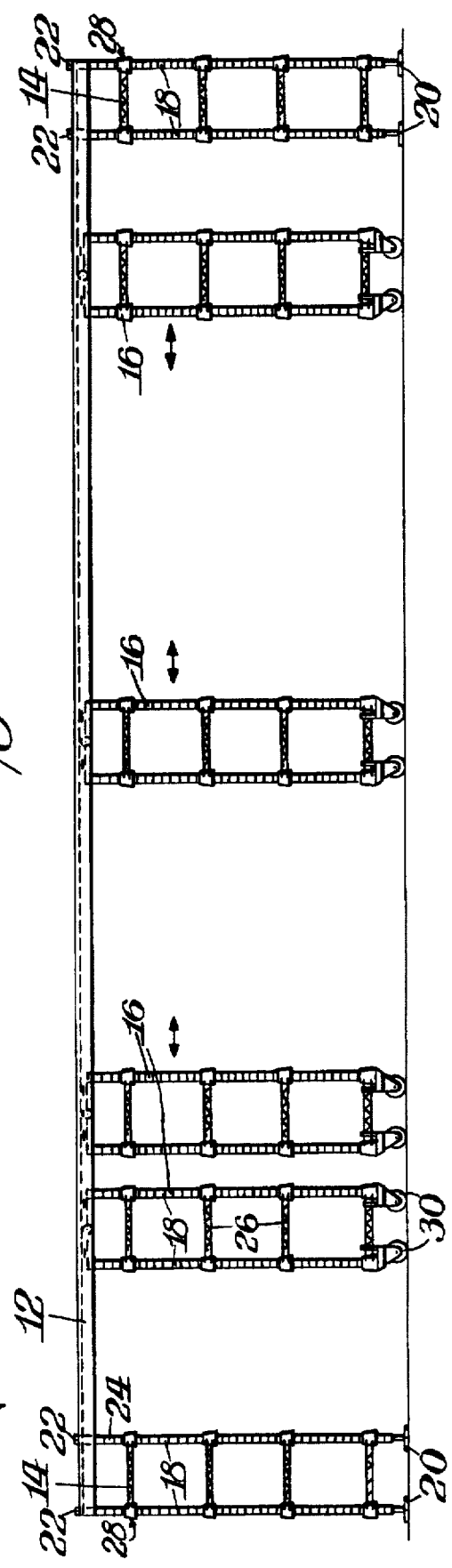

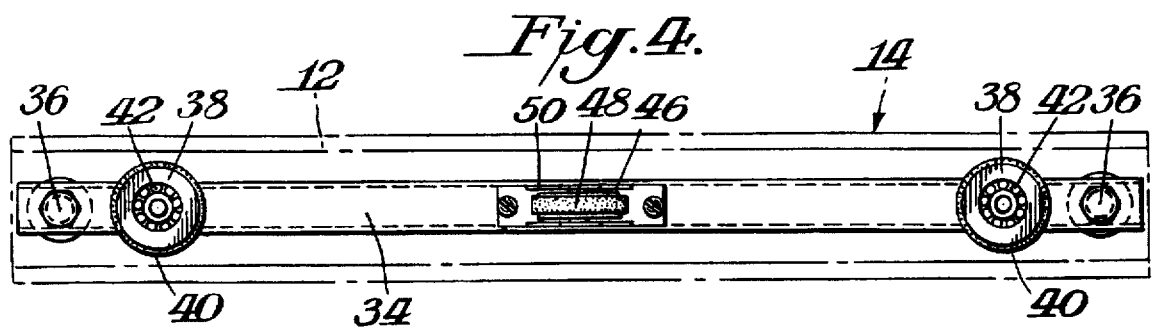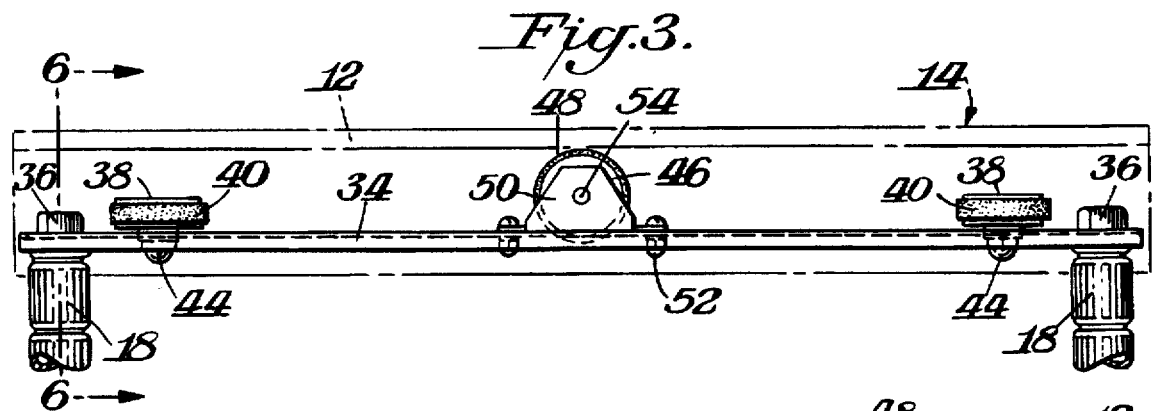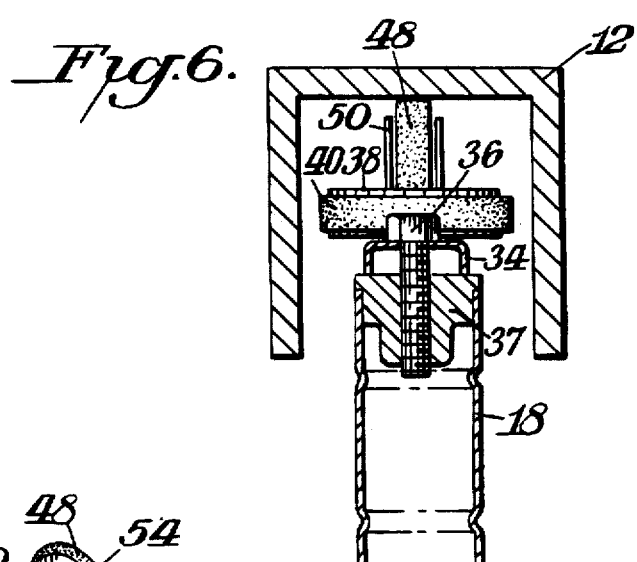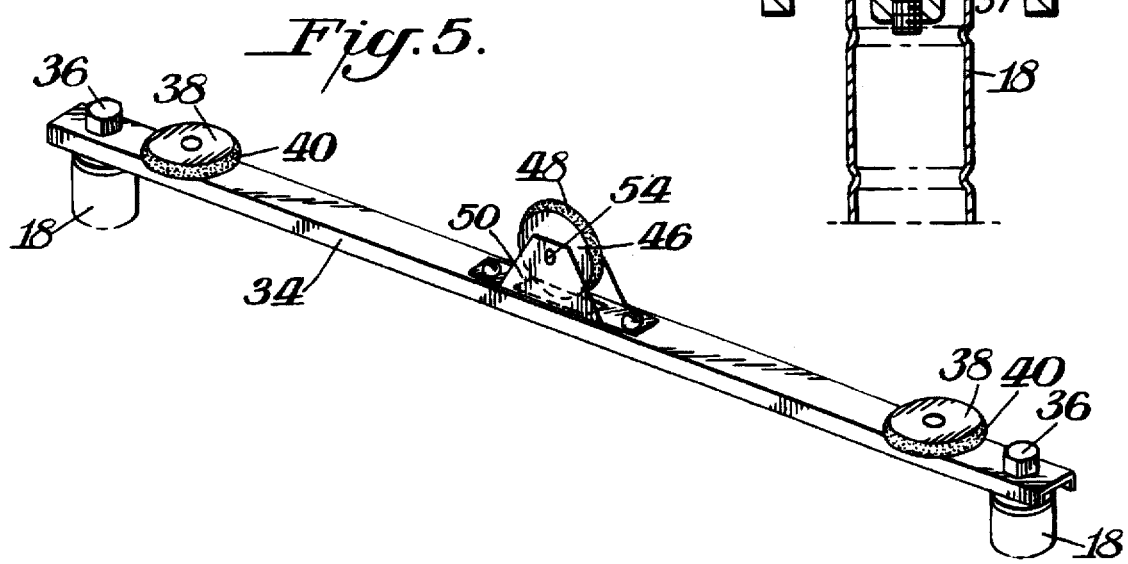

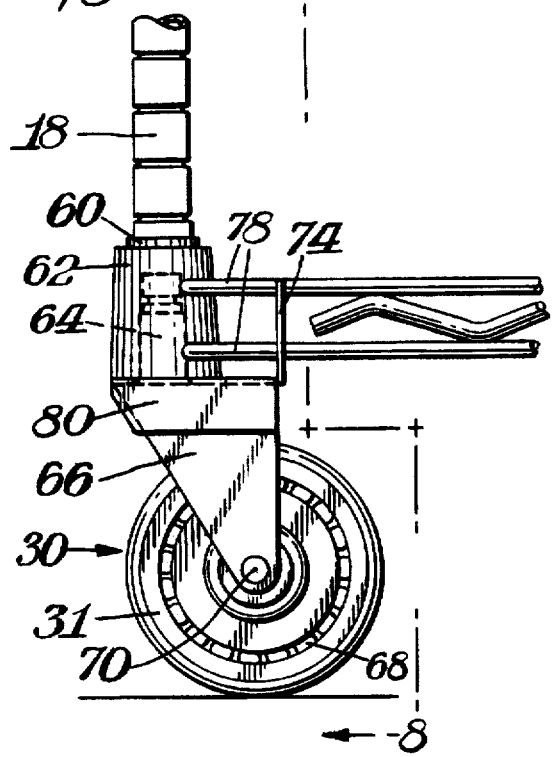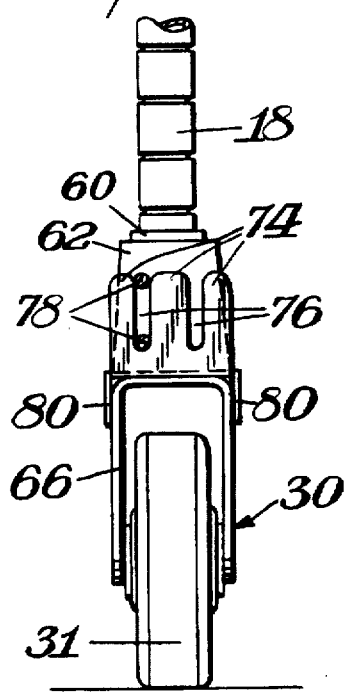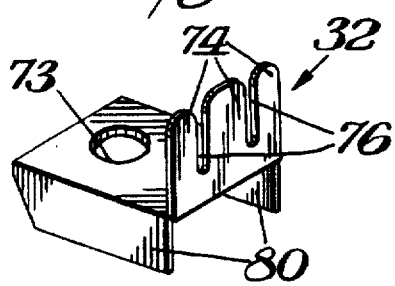

OVERHEAD TRACK HIGH DENSITY STORAGE SYSTEM WITH CENTER AND SIDE GUIDE ROLLERS AND CASTER LOCK ALIGNMENT CLIP

BACKGROUND OF THE INVENTION

The present invention relates to a high density or compact storage system in which storage units, such as shelf units, are movable in such a way so as to define a single movable access aisle. Stationary storage end units support an overhead track that guides translational movement of the movable storage units. The movable storage units can be moved to various positions between the stationary end units, thus moving the access aisle between such movable storage units.

High density or compact storage systems permit easier cleaning with clear access to all shelving units. Floor dirt and debris are more readily cleaned and will not accumulate under the units. As a result, high density storage systems are particularly advantageous in the food service and hospital industries.

A compact storage system is disclosed in U.S. Pat. No. 4,991,725 (Welsch, et al.). In this system, overhead guide rails are supported between stationary shelf end units. The top of the posts of the movable storage units are provided with guide rollers that are received into a channel formed by the guide rail. The guide rollers contact or engage either one of the legs or side walls of the guide rails for movement relative thereto. The movable storage units are apt to jam and their movements hindered, however, when a long length span of guide rail is used, because the longer guide rail sags in the middle and the top of the posts of the movable storage units then may contact the lower inner surface of the guide rail. Thus, the length of the span between stationary units is limited in such prior systems. The maximum typical span lengths with such systems are twenty-one feet. Where the floor is uneven, a rise in floor height will also cause the top of the posts on the movable storage unit to contact the inner surface of the guide rail, making it more difficult to move the storage units. For example, a floor rise of one-half to one inch for each thirty-six inches of track will cause the top of the posts to bind with the top inside surface of the overhead track or guide rail. An overhead track high density storage system that overcomes these disadvantages, permitting use of a longer span guide rail over uneven or unlevel floor surfaces, are objects of the present invention.

The compact storage system in the '725 patent also features a channel that embraces the legs of two casters on one side of a movable storage unit to simultaneously align the direction of the two casters and prevent them from swiveling. Two such channels are used with each movable storage unit. A means to lock the direction of an individual caster would be easier to assemble and use less material. An individual caster alignment device is a further object of the invention.

SUMMARY OF THE INVENTION

The overhead track high density storage system includes at least one overhead track formed from a generally U-shaped continuous channel that is mounted in spaced relation, generally mutually parallel to a generally horizontal surface, such as the floor. The channel is attached at each end to posts of stationary storage units, such as shelving units. The ends of the channel might also be mounted or attached to any other stationary support surface, such as the wall. At least one movable storage unit is provided that has shelves attached or mounted to upstanding posts. The posts are supported for translational movement on the generally horizontal floor surface by casters, swivelable wheels. Guide roller means are attached or mounted to the top of the posts of the movable storage unit. The guide roller means are received in the continuous U-shaped channel of the guide rail so that translational movement of the movable storage unit is confined to a path defined by the continuous U-shaped channel.

The guide roller means include a center guide roller and at least one side guide roller mounted for rotational movement to a guide roller support channel. The guide roller support channel is mounted at each end to the top of a support post of a movable storage unit. Preferably, two channels are mounted in parallel relation onto a movable storage unit, with each being received into a separate U-shaped continuous channel. The center guide roller may contact the bottom inner surface of the U-shaped continuous channel. The side rollers may contact at least one inner side surface of the U-shaped continuous channel. The guide roller means thus allows for free translational movement of the movable storage unit along the path defined by the U-shaped continuous channel.

The center guide roller is raised above the top of the posts of the movable storage unit so that the tops of the posts do not contact the bottom inner surface of the U-shaped continuous channel, even when there is a rise or bump in the generally horizontal floor surface, or when the center of the U-shaped continuous channel sags down or is bent down. The center guide roller in combination with the guide roller support channel and the movable storage units effectively supports the central portion of the continuous U-shaped channel.

In a further embodiment, the movable storage units are provided with a caster lock alignment clip that is positioned around the pivot pin of the caster. The caster lock alignment clip has downturned skins that engage the depending legs of the caster bracket. The clip further has upstanding fingers separated by at least one slot, which slot engages a lower portion of the movable storage unit. Preferably, the movable storage unit will incorporate the QUAD TRUSS™ wire shelves supplied by Metal Masters Foodservice Equipment Co., Inc. In such case, the slot between the fingers of the caster alignment clip will engage the horizontal support rods of such wire shelf. Most preferably, the single caster lock alignment clip will have at least two slots between upstanding fingers, separated in such manner that the clip may be used to lock the caster on either the left or right side of the movable storage unit. Such single caster locking clip is easier to assemble and use and requires less material, thereby adding less weight to the storage unit.

Other objects, aspects and advantages of the overhead track high density storage system of the present invention will be explained or understood from the following detailed description of a preferred embodiment, taken in conjunction with the accompanying drawings.

DESCRIPTION OF THE DRAWINGS

FIG. 1 is a side elevational view of an overhead track high density storage system according to the invention;

FIG. 2 is a top plan view of the overhead track high density storage system of FIG. 1;

FIG. 3 is a side elevational view of a roller guide channel and guide rollers with the U-shaped continuous channel overhead track shown in phantom outline;

FIG. 4 is a top plan view of the roller guide channel and guide rollers and track in phantom outline of FIG. 3;

FIG. 5 is a perspective view of the roller guide channel and guide rollers of FIGS. 3–4;

FIG. 6 is a cross-sectional end elevational view taken along line 6—6 of FIG. 3;

FIG. 7 is a side elevational view of the caster lock alignment clip of the invention attached to a movable storage unit;

FIG. 8 is a cross-sectional end elevational view taken along line 8–8 of FIG. 7; and FIG. 9 is a perspective view of the caster lock alignment clip of the invention.

DETAILED DESCRIPTION OF THE PREFERRED EMBODIMENTS

In a preferred embodiment, the overhead track high density storage system of the present invention is adapted for use with a wire shelving system that incorporates the QUAD TRUSS™ wire shelving offered by Metal Masters Foodservice Equipment Co., Inc. Nevertheless, the general principle of the invention may be incorporated into other storage systems using various other storage units or shelves. A more detailed description of the QUAD TRUSS™ shelving is given in U.S. Pat. No. 5,390,803, the disclosure of which is incorporated herein by reference.

Referring to FIG. 1, an overhead track high density storage system 10 includes an overhead track 12 supported between two stationary support storage shelf units 14, with one or more movable storage shelf units 16 positioned between the stationary support storage shelf units 14. The stationary storage units 14 have four corner support posts 18, with attached leveling foot pads 20 at the bottom end of the posts 18 and bolts 22 connected to the top of each of the posts 18. The posts 18 are scored with a series of spaced annular grooves 24. The shelves 26 are mounted to the posts 18 with a sleeve and collar assembly 28 at each corner of the shelf. The sleeve and collar assembly 28 surrounds the post 18 and is positioned with reference to the annular grooves 24. Further detail of such attachment between the sleeve and collar assembly 28 and post 18 is shown and described in U.S. Pat. Nos. 3,424,111 (Maslow) and 3,757,705 (Maslow).

The overhead track 12 is formed from a continuous U-shaped channel and is positioned so that the side legs of the channel depend downward. One end of the overhead track 12 is attached by bolts 22 to the top end of one support post 18 of one stationary storage unit 14 and at its other end to the top end of a support post 18 of a second stationary storage unit 14. The posts 18 of the stationary storage units 14 hold the overhead track 12 spaced above, and generally parallel to, a base or floor. The ends of the overhead track 12 alternately might be mounted to other fixed or stationary objects, such as a wall.

Preferably, a pair of overhead tracks 12 are installed separated and in parallel relation between two stationary storage units 14. Most preferably, each end of the overhead track 12 is bolted in two places to two support posts 18 of the stationary storage units 14, as shown in FIGS. 1 and 2.

At least one mobile storage unit 16, which also may use QUAD TRUSS™ shelving components, is mounted between the stationary support storage units 14. The mobile storage unit 16 includes four corner support posts 18 on which are mounted a number of shelves 26. A caster 30 is mounted at the bottom of each corner support post 18. The mobile storage unit 16 may be freely rolled for translational movement between the stationary support shelving units 14, as indicated by the arrows drawn in FIG. 1.

As seen best in FIG. 2, the stationary support storage shelf units 14 and the mobile storage shelf units 16 use shelves having the same length dimension. Accordingly, the corner support posts 18 are spaced apart in the direction of the length of both the mobile storage unit 16 and stationary storage unit 14 by the same distance "L". Respective pairs of corner posts of the mobile storage unit are aligned with one overhead track 12 extending between the stationary support storage units 14. The top of the support posts 18 of the mobile storage units 16 are provided with guide roller means, to be described in detail below, that are received within one of the overhead tracks 12 so that translational movement of the mobile storage units 16 is confined to a path defined by the overhead tracks 12.

The overhead track high density storage system shown in FIGS. 1 and 2 permits several mobile storage units 16 to be positioned between the stationary storage units 14. The total width of the mobile storage units 16 included in the storage system should be less than the distance between the stationary storage units 14. In this way, any two mobile storage units 16, or any one mobile storage unit 16 and a stationary support storage unit 14 may be positioned closely adjacent each other with a space remaining between at least two of the storage units. This space forms the "active aisle" that can be shifted by moving the mobile storage units 16, to provide access to any side of any storage unit while other mobile storage units are moved to their closely adjacent space-saving positions.

Referring now to FIGS. 3–6, the details of a preferred guide roller means will be described. The guide roller support channel 34 is formed from a generally U-shaped channel. Each end of the channel 34 is connected by a bolt 36 to the top of a support post 18 of a mobile storage unit 14. The bolt 36 engages a threaded insert 37 fit into the core of the top end of the support post 18 (FIG. 6). The legs of the U-shaped channel 34 depend downwardly and surround the top of the posts 18.

One or more side guide rollers 38 are attached by cap nuts 44 to the top upper surface of the support channel 34. The side guide rollers preferably have a rubber tire or other friction surface 40 about the circumference and ball bearings 42 within for free rotation about the axis defined by the cup nut 44. The side guide rollers 38 have a diameter that is wider than the width of the support channel 34, but narrower than the distance between the depending side rails of the overhead track 12.

A center guide roller 46 is mounted on an axle 54 held by a U-shaped bracket 50. The bracket 50 is attached with cap nuts 52 to the top upper surface of the guide roller support channel 34. The center guide roller 46 may be of the same type and size as the side guide roller 38. That is, the center guide roller 46 may have a rubber tire or other friction surface 48 about its circumference and may have ball bearings for free rotation about the axis defined by the axle 54. The center guide roller must have a portion of its surface exposed above the upper edge of the bracket 50. Most preferably, the center guide roller is mounted at or very near the center of the guide support channel 34 and a side guide roller 38 is mounted at or near each end of the guide support channel 34.

In a storage system having two parallel overhead tracks, the mobile storage unit 16 will preferably have two guide roller means attached to the top of its support posts 18. One guide roller means will be attached to two corner posts on one side of the shelf storage unit, and the other guide roller means to the other corner posts on the other side of the shelf storage unit. The guide roller means are received within the overhead track when the mobile storage unit is used in the overhead track high density storage system.

Using the guide roller means according to this invention, the length of the span of the overhead track for a high density storage system may be substantially increased. For example, the span length can be increased from the customary twenty or twenty one feet to about twenty five or thirty five feet, or perhaps even longer. Moreover, the system will not block or jam or bind when used in a room with an uneven or bumpy floor. The outer circumferential edge of the center guide roller 46 contacts the upper inner surface of the overhead track 12. The center guide roller 46 may roll against and ride along the upper inner surface of the overhead track 12 when the mobile storage unit 16 is moved within the storage system. The center guide roller 46, bracket 50 and channel 34, in combination with the mobile storage unit 16, acts to hold up or push up the overhead track. Thus, if the track is sagging or the floor is uneven, the guide roller means acts to hold up the overhead track 12.

The outer circumferential edges of the side guide rollers 38 may contact the inner surfaces of the side legs or rails of the overhead track 12 as the mobile storage unit 16 is moved from one location to another within the system. The side guide rollers preferably contain ball bearings and will freely rotate when the outer roller surface contacts the overhead track surface as the mobile storage unit is moved along the tracks in the storage system. Accordingly, movement of the mobile storage unit is confined to a path defined by the overhead track by engagement of the side guide rollers with the side legs or rails of the overhead track.

The guide roller means, including the guide support channel 34, side guide rollers 38 and center guide roller 46 may be shipped to the end user in an assembled form. The end user may assemble the mobile storage units from the bottom up, mounting the shelves to the corner posts. Once the mobile storage units are otherwise completely assembled, the guide roller means may then be mounted on the tops of pairs of support posts as described above, and the system assembly can be completed.

The present invention also includes a structure for preventing the caster 30 from swiveling in its socket with respect to the corner support posts 18. The structure confines the wheel 31 of the caster 30 so that the shaft of the wheel extends generally perpendicularly to the plane defined by the sides of the mobile storage units.

As shown in FIGS. 7-8, the caster 30 comprises a wheel 31 mounted on an axle 70 held by a caster bracket 66, which in turn is attached to a caster pivot 64. The caster wheel may contain ball bearings 68 that permit the wheel 31 to more freely rotate about the axis defined by the axle 70. The caster pivot 64. is offset from and aligned substantially perpendicularly to the axle 70. The caster bracket 66 rotates about the axis defined by the pivot 64. Thus, without an alignment means the caster bracket 66 and wheel 31 may swivel about the pivot 64, permitting the caster to travel in various directions. The caster 30 is attached to the bottom end of a support post 18 of a mobile storage unit 16. Customarily, the pivot pin 64 is inserted into the central portion of the support post. A split locking ring (not shown) may be mounted in the groove of the caster pivot pin 64 to hold the pin within the support post 18.

The mobile storage unit 16 may have a wire shelf mounted at or near the bottom portion of the corner support post 18, such as a QUAD TRUSS# wire shelf that includes a corner sleeve 62. The corner sleeve 62 fits around a split retainer collar 60 that is positioned around the support post at or near a groove. The corner sleeve 62 is force-fit around the retainer collar 60 and post 18 to hold the corner of the shelf in place. Wire shelf support rods 78 are attached to the corner sleeve 62 and project outwardly therefrom to form, with other wires, a truss structure to support the shelf mats or weight-bearing surface of the shelf. If such or similar wire shelving has been installed in the mobile storage unit 16, the direction of the wheel 31 of the caster 30 may be aligned with a caster alignment clip 32 according to the present invention.

As shown in detail in FIG. 9, the caster alignment clip 32 has a flat upper generally horizontal surface defining a hole 73 that fits over or around the caster pivot pin 64. A down-turned skirt 80 depends down from each side of the upper surface of the alignment clip 32 and upstanding fingers 74 project up from the upper horizontal surface. One or more slots 76 are formed between such upstanding fingers 74.

When the alignment clip 32 is installed with the caster 30, the clip 32 is positioned such that the hole 73 fits around the caster pivot pin 64, the downturned skirts 80 engage each side of the caster bracket 66, and the slot 76 engages one or more support rods 78 from the shelf truss. The alignment clip 32 prevents the caster wheel 31 and bracket 66 from swiveling or rotating about the pivot pin 64, because the upstanding fingers 74 and slot 76 therebetween firmly engage one or more reds from the shelf, and the downturned skirts hold the bracket 66 in position.

Because the corner posts and shelves of the mobile storage units are aligned together within the high density storage system such that the tops of the support posts fit within the overhead tracks, to permit translational movement along the direction of the tracks, the alignment clip 32 aligns the caster wheel also in the proper direction of travel. That is, the upstanding fingers 74 and slot 76 engage the reds of the front or rear of a wire shelf that must be itself aligned in the direction of travel. The alignment clip 32 always engages the shelf wires so as to hold the caster wheel in a direction perpendicular to the side of the shelf.

Preferably, the alignment clip 32 has at least three upstanding fingers 74 forming at least two slots 76 therebetween. In such embodiment the clip may be used to align the caster direction on any corner post of the mobile storage unit. As shown in FIG. 8, for example, the shelf reds 78 may be offset from center in relation to the corner sleeve 62 and support post 18. One slot 76 of the alignment clip may engage the reds 78 on the front of the shelf to align the caster bracket 66. However, if the caster is used to align the caster bracket 66 on the rear of the shelf, the other slot 76 may engage the reds 78 on the rear of the shelf.

The alignment clip 32 according to the present invention permits the end user to align the direction of the casters individually. It is easy to install and requires less material than the channels for aligning multiple casters previously used with many high density storage systems. The single caster alignment clip 32 of this invention also permits greater front and rear access under the mobile shelf units, eliminating the low channel that spans between two casters in prior systems. Although particular embodiments of the present invention have been described in detail above, for purposes of illustration, modifications can be made to the described structure to adapt it to other particular applications.

We claim:

1. In an overhead track storage system with an overhead track formed from a generally U-shaped continuous channel, means for mounting said channel in spaced, generally mutually parallel relation to a horizontal base surface, at least one movable storage unit having means for supporting said storage unit for translational movement on said horizontal base surfaces and guide roller means mounted on said storage unit and received in the continuous U-shaped channel so that translational movement of the movable storage unit is confined to a path defined by the continuous U-shaped channel, the improvement comprising:

a center guide roller and a side guide roller attached for rotational movement to a guide roller support channel that is mounted to the movable storage unit, said center guide roller, side guide roller and guide roller support channel forming the guide roller means.

2. The overhead track storage system of claim 1, wherein the U-shaped channel has a lower inner surface and two side inner surfaces and the guide roller support channel has an upper surface and a lower surface and two ends and is mounted at each end to a support post of the movable storage unit, and the center guide roller is mounted for rotational movement to the guide roller support channel on an axle between upstanding arms of a bracket attached to the upper surface of the guide roller support channel that the center guide roller may contact the lower inner surface of the U-shaped channel and will rotate when the movable storage unit is moved along the path defined by the U-shaped channel and when the center guide roller is in contact with the U-shaped channel.

3. The overhead track storage system of claim 2, wherein the side guide roller contacts at least one side inner surface of the U-shaped channel and rotates when the movable storage unit is moved along the path defined by the U-shaped channel.

4. An overhead track storage system, comprising:

an overhead track formed from a generally U-shaped continuous channel having a lower inner surface and two side inner surfaces;

means for mounting said overhead track in spaced, generally mutually parallel relation to a horizontal base surface;

at least one movable storage unit with means for supporting said storage unit for translational movement on said horizontal base surface, said support means comprising at least two casters;

a center guide roller and a side guide roller mounted for rotational movement to a guide roller support channel that is mounted at each end to the movable storage unit, wherein the center guide roller may contact the lower inner surface of the U-shaped channel and the side guide roller contacts at least one side inner surface of the U-shaped channel and the rollers rotate when they are in contact with the U-shaped channel and the movable storage unit is moved along the path defined by the U-shaped channel.

5. The overhead track storage system of claim 4, wherein the movable storage unit comprises a shelf unit having shelves mounted to posts, the casters are mounted to the bottom of the posts of the movable storage unit and the guide roller support channel mounted to the top of the posts of the movable storage unit.

6. The overhead track storage system of claim 4, wherein the center guide roller and side guide roller have circumferential edges that are coated with a high friction material.

7. In an overhead track storage system with an overhead track formed from a generally U-shaped continuous channel, means for mounting said channel in spaced, generally mutually parallel relation to a horizontal base surface, at least one movable storage unit and guide roller means mounted on said storage unit and received in the continuous U-shaped channel so that translational movement of the movable storage unit is confined to a path defined by the continuous U-shaped channel, the improvement comprising:

means for supporting said storage unit for translational movement on said horizontal base surface that include a caster including a wheel and a pivot and a caster bracket with depending legs between, in which said wheel is mounted for rotation; and a caster lock alignment clip having downturned skirts that engage the depending legs of the caster bracket, and upstanding fingers separated by a slot that engages the movable storage unit.

8. The overhead track storage system of claim 7, wherein the movable storage unit comprises a shelf mounted to an upstanding post, said shelf having a truss support rod, and the slot between the fingers of the caster lock alignment clip engages the truss support rod of the shelf.

9. The overhead track of storage system claim 8, wherein the caster lock alignment clip has a top surface that defines an opening into which the pivot of the caster may be engaged.

10. The overhead track storage system of claim 8, wherein the caster lock alignment clip has at least two slots between the fingers.

11. An overhead track storage system, comprising:

an overhead track formed from a generally U-shaped continuous channel;

means for mounting said overhead track in spaced, generally mutually parallel relation to a horizontal base surface;

at least one movable storage unit with means for supporting said storage unit for translational movement on said horizontal base surface, said support means comprising a caster including a wheel and a pivot and a caster bracket with depending legs between which said wheel is mounted for rotation and further comprising a caster lock alignment clip having downturned skins that engage the depending legs of the caster bracket and upstanding fingers separated by a slot that engages the movable storage unit; and guide roller means mounted on said storage unit and received in the continuous U-shaped channel so that translational movement of the movable storage unit is confined to a path defined by the continuous U-shaped channel.

12. The overhead track storage system of claim 11, wherein the movable storage unit comprises a shelf mounted to an upstanding post, said shelf having horizontal support rods, and the slot between the fingers of the caster lock alignment clip engages the horizontal support rods of the shelf.

13. The overhead track storage system of claim 12, wherein the caster lock alignment clip has at least two slots between the fingers.

14. A caster lock alignment clip for aligning the direction of a caster bracket of a caster attached to a movable article, said caster having a wheel and a pivot and the caster bracket being swivelable about the pivot and having depending legs between which said wheel is mounted on a shaft for rotation, comprising:

an upper surface defining an opening that engages the pivot of the caster, downturned skirts that engage the depending legs of the caster bracket; and upstanding fingers separated by a slot, which slot engages a portion of the movable article, so that the clip aligns the caster bracket in a desired direction and the bracket does not substantially swivel about an axis defined by the pivot.

15. The overhead track storage system of claim 1, wherein the guide roller support channel has a front end and a rear end, and a plurality of side guide rollers are attached for rotational movement to the guide roller support channel with at least one of said side guide rollers attached near the front end of the channel and at least another of said side guide rollers attached near the rear end of the channel.

16. The overhead track storage system of claim 4, wherein the guide roller support channel has a front end and a rear end, and a plurality of side guide rollers are attached for rotational movement to the guide roller support channel with at least one of said side guide rollers attached near the front end of the channel and at least another of said side guide rollers attached near the rear end of the channel.

* * * * *

UNITED STATES PATENT AND TRADEMARK OFFICE
CERTIFICATE OF CORRECTION

PATENT NO. : 5,680,942  Page 1 of 4
DATED : October 28, 1997
INVENTOR(S) : McAllister, et al It is certified that error appears in the above-identified patent and that said Letters Patent is hereby corrected as shown below:

In claim 1 at Col. 7, line 3, please insert —inverted— after "generally".

In claim 1 at Col. 7, line 4, please insert —having a lower inner surface and two side inner surfaces— before "means".

In claim 1 at Col. 7, line 11, please insert —inverted— after "continuous".

In claim 1 at Col. 7, line 13, please insert —for engaging the lower inner surface of the inverted U-shaped channel— after "center guide roller".

In claim 1 at Col. 7, line 13, please insert for engaging both side inner surfaces of the inverted U-shaped channel, both rollers— after "side guide roller".

In claim 2 at Col. 7, line 19, please delete "the U-shaped channel has a lower inner surface and two side inner surfaces and".

In claim 4 at Col. 7, line 38, please insert —inverted— after "generally".

In claim 4 at Col. 7, line 49, please insert —for engaging the lower inner surface of the inverted U-shaped channel— after "center guide roller".

UNITED STATES PATENT AND TRADEMARK OFFICE
CERTIFICATE OF CORRECTION

PATENT NO. : 5,680,942
DATED : October 28, 1997
INVENTOR(S) : McAllister, et al

It is certified that error appears in the above-identified patent and that said Letters Patent is hereby corrected as shown below:

In claim 4 at Col. 7, line 49, please insert --for engaging both side inner surfaces of the inverted U-shaped channel, both rollers-- after "side guide roller".

In claim 7 at Col. 8, line 1, please insert --at least one movable storage unit having a plurality of generally vertical support posts and a shelf between the vertical support posts and-- after "system with".

In claim 7 at Col. 8, line 2, please insert --inverted-- after "generally".

In claim 7 at Col. 8, line 2, please insert --having a lower inner surface and two side inner surfaces,-- before "means".

In claim 7 at Col. 8, lines 4-5, please delete "at least one movable storage unit".

In claim 7 at Col. 8, line 8, please insert --inverted-- after "continuous".

In claim 7 at Col. 8, line 17, please insert --the shelf of-- after "engages".

In claim 11 at Col. 8, line 32, please insert --inverted-- after "generally".

In claim 11 at Col. 8, line 38, please insert --with a plurality of generally vertical support posts and a shelf between the vertical support posts and-- after "storage unit".

UNITED STATES PATENT AND TRADEMARK OFFICE
CERTIFICATE OF CORRECTION

PATENT NO. : 5,680,942　　　　　　　　　　　　　Page 3 of 4
DATED : October 28, 1997
INVENTOR(S) : McAllister, et al It is certified that error appears in the above-identified patent and that said Letters Patent is hereby corrected as shown below:

In claim 11 at Col. 8, line 46, please insert —the shelf of— after "engages".

In claim 11 at Col. 8, line 49, please insert —inverted— after "continuous".

In claim 14 at Col. 9, line 1, please insert —adapted to— after "opening".

In claim 14 at Col. 9, line 1, please delete "that engages" and insert —engage—.

In claim 14 at Col. 9, line 2, please insert —adapted to— after "skirts".

In claim 14 at Col. 9, line 2, please delete "that".

UNITED STATES PATENT AND TRADEMARK OFFICE
CERTIFICATE OF CORRECTION

PATENT NO. : 5,680,942
DATED : October 28, 1997
INVENTOR(S) : McAllister, et al

It is certified that error appears in the above-identified patent and that said Letters Patent is hereby corrected as shown below:

In claim 14 at Col. 9, line 4, please insert —generally horizontally aligned— after "engages a".

In claim 14 at Col. 9, line 5, please insert —separate from the caster— after "article".

Signed and Sealed this

Thirty-first Day of March, 1998

*Attest:*

BRUCE LEHMAN

*Attesting Officer*      *Commissioner of Patents and Trademarks*